(12) United States Patent
Gloukharev et al.

(10) Patent No.: US 6,367,722 B1
(45) Date of Patent: Apr. 9, 2002

(54) METHOD OF PRODUCING POWDER MATERIALS

(76) Inventors: Nicolai Fedorovich Gloukharev, pr. Slavy, d. 4, kv.33; Leonid Petrovich Zarogatskiy, per. Uglovoi, d. 5, kv. 21, both of St. Petersburg (RU), 198052; Valeriy Grigorievich Levinson, Leninskiy pr., d. 110. korp. 1, kv. 92, St. Petersburg (RU), 198303; Vyacheslav Sergevich Morozov, ul. Lensoveta, d. 30, kv. 9, St. Petersburg (RU), 196143

(*) Notice: Subject to any disclaimer, the term of this patent is extended or adjusted under 35 U.S.C. 154(b) by 0 days.

(21) Appl. No.: 09/462,030
(22) PCT Filed: Jul. 13, 1998
(86) PCT No.: PCT/RU98/00226
  § 371 Date: Dec. 29, 1999
  § 102(e) Date: Dec. 29, 1999
(87) PCT Pub. No.: WO99/08793
  PCT Pub. Date: Feb. 25, 1999

(30) Foreign Application Priority Data

Aug. 13, 1997 (RU) .......................................... 97114487

(51) Int. Cl.$^7$ ................................................ B02C 19/06
(52) U.S. Cl. ............................................ 241/5; 241/26
(58) Field of Search ........................ 241/30, 25, 24.14, 241/5, 1, 26

(56) References Cited

U.S. PATENT DOCUMENTS 4,069,145 A * 1/1978 Sommer, Jr. et al. ....... 209/212
5,921,478 A * 7/1999 Kamiwano et al. ............ 241/5

FOREIGN PATENT DOCUMENTS

RU        1724369        4/1992

* cited by examiner

Primary Examiner—Lowell A. Larson
(74) Attorney, Agent, or Firm—Bazerman & Drangel, PC

(57) ABSTRACT

A method is provided for obtaining fine powders having narrow particle size range from non-conducting solids comprising the steps of: 1) creating an electrostatic charge on particles of a solid mixture formed by mechanical means, 2) grinding the mixture and neutralizing the electrostatic charge during grinding with a potential sufficient to create a corona discharge, 3) separating the powder according to particle size, and 4) collecting the finely ground finished powder product. The method is applicable to the manufacture of high quality cement powders.

8 Claims, No Drawings

METHOD OF PRODUCING POWDER MATERIALS

The present invention relates to the technology of producing finely powdered materials having narrow particle size range particularly, for use in mining and construction.

BACKGROUND OF THE INVENTION

Technological processes such as those employed in the mining and construction industries often require a step in which solid materials or coarsely ground materials are reduced to relatively fine powders so that they are in a condition to be dispersed in a subsequent step of the process. Several different methods of physically treating solid materials in order to put them into a condition where they may be readily dispersed are known. One such method of getting such dispersion conditioned materials is disclosed in Inventor's Certificate USSR 1.431.864, I. cl. B07B 1/40 1988 which comprises electromagnetic conditioning (i.e. electrostatic charging) of a polyfractional mixture of a material after grinding, its separation, and the collection of finished powdered material. It should be noted that electromagnetic separation of fine and large particles after the polyfractional mechanical mixture has been formed, is taught in this method, i.e. electromagnetic conditioning does not take place during the grinding process. Such electromagnetic conditioning does not permit concentrated field forces to work efficiently with structural defects, such as point defects developed in particles of the processed material mixture (see Levich V. G. "Theoretical physics", M. Nauka, 1969, p. 75). Thus, electromagnetic conditioning action taught in this method does not promote any further break down to finer particles.

Another method known in the prior art for production of ground powdered materials is disclosed by Story in U.S. Pat. No. 5,507,439 in which an electrostatic charge is imparted to a starting powder to form a charged powder and then milling or grinding the charged powder to produce a milled powder. In the electrostatic conditioning step, charge is transferred using an alternating current (AC) or a direct current (DC) high-voltage generator that delivers 10,000 to 1,000,000 volts at a frequency of 1 to 10,000 Hz.

A mill is disclosed in Inventor's Certificate USSR-SU-A-1.724.369 I.cl. B02C 19/18 1978 which functions by electromagnetic conditioning of the material to be treated. Initial ground material (e.g., cement) is loaded then high voltage is applied to two electrodes, electromagnets are turned on, and then a current-conducting impeller fans a dust-air mixture into an ionizer where the particles become electrostatically charged. The charged particles are then entrapped by the accelerator's electromagnetic field where additional grinding takes place through collisions with neutral particles. The charged particles go to a neutralizer, in the form of a current-conducting impeller, where electrical neutralization and additional grinding collisions take place, which is followed by separation of the finely ground powder in a vortex chamber.

Although U.S. Pat. No. 5,507,439 and Inventor's Certificate USSR-SU-A-1.724.369 I.cl. B02C 19/18 1978 contemplate putting an electrostatic charge on the primary powder particles by applying high voltage utilizing two electrodes to allow additional outer mechanical grinding to improve the grinding quality, the charged particles are passively neutralized at the final stage of the grinding by contacting a current conducting grounded element. There is also no possibility of neutralizing electric counter potentials or opposite charges that develop in cracks and break fissures of the particles during grinding that keep the particles from breaking down further. These unneutralized potentials lead to partial cracks rejoining after mechanical treatment. As a result, the energy used for grinding is consumed in abrading the particles and rolling them into a spherical shape rather than breaking them apart. In the separation process these rolled particles tend to rebound from the layer of powder that adheres to the wall of e.g. a vortex separator while more undersized particles get through the separation screens leading to ground powders having a wide range of particle sizes.

There is therefore a need for a method to more efficiently reduce particle size by grinding and to facilitate separation of particles produced by grinding into more narrowly defined particle size ranges or metric fractions so that particle size ranges preferred for particular products can be obtained and to obtain narrow particle size ranges required for certain types of premium products such as cement mixtures.

BRIEF DESCRIPTION OF THE INVENTION

The present invention is directed to meeting the foregoing needs by providing a method for obtaining fine powders having narrow particle size range from non-conducting solids comprising the steps of: 1) creating an electrostatic charge on particles of a solid mixture formed by mechanical means 2) grinding the mixture and neutralizing the electrostatic charge during grinding 3) separating and 4) collecting the finely ground finished powder product.

The present invention may be applied to any mechanical mixture of non-electrically conducting materials in order to reduce it to a powder having a finer and more uniform particle size. The method of the present invention differs from the methods of Story in U.S. Pat. No. 5,507,439 and Inventor's Certificate USSR-SU-A-1.724.369 I.cl. B02C 19/18 1978 in that the electric charges present during the grinding process are discharged or electrically neutralized by applying a depolarization potential to the powdered mixture while it is being ground.

DESCRIPTION OF THE PREFERRED EMBODIMENTS

Fine powders having narrow particle size ranges can be obtained from non-conducting solids by the process of the present invention which comprises the steps of:

a) providing a mixture of non-electrically conducting solid particles;

b) creating an electrostatic charge on particles of the mixture;

c) grinding the mixture of solid particles and neutralizing the electrostatic charge by exposing the mixture to an electrical potential sufficient to produce a corona discharge during grinding;

d) separating particles formed in step c) according to particle size range;

e) collecting the separated particles.

For electro-neutralization the mixture is preferably exposed to a depolarizing electrical potential of 10 to 60 V. When the potential value is less than 10 V, the powder mixture cannot be easily separated into its component fractions while at potentials exceeding 60 V, undesirable electrochemical reactions may occur in the mixture. For concrete powders potentials in the middle of the range, that is 35 V to 45 V, are more preferred with 40 V most preferred as it produces finer particles of narrow range. The depolarization potential is preferably applied through a single electrode.

Since during grinding of the powdered mixture large electrostatic charges remain on the freshly exposed surfaces there is agglomeration of particles that makes grinding and separation difficult, thus preventing the production of finely ground particles in a narrow size range. Particle size reduction is enhanced by application of the depolarizing electric potential during grinding because a corona discharge develops creating an intense zone of ionized air resulting in the neutralization of the charges on fracture surfaces and fissures of the powder particles. Consequently, any surface polarization that might develop on fracture surfaces or fissures that cause the particles to hold together are neutralized allowing the fissures to continue developing which results in further breakdown of the particles. Agglomeration of particles due to the presence of surface polarized electric charges is also prevented.

As a result of applying a depolarizing electric potential during milling, more angular powder particles are formed and specific energy consumption for the grinding process is reduced. Separation via screening is facilitated as fine particles do not agglomerate but instead pass through screens intended to separate fines from the mixture. This results in the product having a narrower particle size distribution while the collected fines can be used for blends or as separate product. The aforesaid electroneutralization process may also be used to enhance the separation of a milled powder. By conducting the separation in the presence of such a depolarizing potential, triboelectric charges on the particles are neutralized thereby yielding a finished powder having a more preferable that is, a narrower particle size distribution which is considered to be a higher quality product.

The following examples which further illustrate embodiments of the invention are not intended to limit it in any way:

Example 1

The goal of this example was to obtain high standard cement powder having a narrow particle size range used in construction. This cement contains 55–65% of particles having a size in the range of 3–30 m and corresponds to "500" trademark as State Standard 25238-82.

The process was applied to a granular mixture consisting of 95% by weight of initial clinker and 5% by weight of gypsum. This starting mixture had a particle size over 80 m which entered the mill as reverse flow from the separator. The starting mixture was then electro magnetically conditioned (i.e. electrostatically charged) and subsequently ground while being exposed to a depolarizing electric potential (i.e. electroneutralization potential) of 10 V which is the lowest end of the preferred range. The mixture was ground in a cement ball mill having a diameter of 2.6 m and a length of 13 m at a drum revolution velocity of 16 rev/min. The specific cement surface was 350 $m^2$/kg, the mill capacity was 26 t/hour. The ground mixture was then separated using a scattering type mechanical centrifugal air-ventilating separator. Separator diameter was 3.2 m, revolution frequency was 245 rev/min. and separator capacity was 30 t/hour. The cement powder collected after separation had a narrow particle size range consisting of 71% by weight of particles in the range of 3–30 m and 63% of particles in the 10–30 m range and did not contain coarse grains that needed regrinding. The parameters of the process may be varied to produce narrower particle size ranges of the cement that is produced.

Example 2

Example I was repeated but the applied depolarizing electrical potential (i.e. electro-neutralization potential) was 60 V, the highest end of the preferred range. The resultant cement powder had a particle size range consisting of up to 74% by weight of particles in the 3–30 m size range and up to 65% by weight of particles in the 10–30 m size range.

Example 3

Example I was repeated but the applied depolarizing electric potential (i.e. electro-neutralization potential) was 40 V, near the center of the preferred range. The resultant cement powder had a particle size range consisting of up to 78% by weight of particles in the 3–30 m size range and up to 69% by weight of particles in the 10–30 m size range.

The results of the Examples are summarized in the following table and are compared with the particle size content of trade mark "500" production process cement corresponding to State Standard 25238-82.

| Cement From: | PARTICLE SIZE CONTENT (% MASS) | |
| --- | --- | --- |
| | 3–30 m | 10–30 m |
| Example 1 | 71 | 63 |
| Example 2. | 74 | 65 |
| Example 3. | 78 | 69 |
| By State Standard 25238-82. | 55-65 | 33-47 |

Comparison of the results in the table show that the best results were achieved by grinding under electroneutralization conditions at a depolarizing potential of 40 V. In all cases, however., the resultant cement mix far exceeds the State Standard for the quantity of particle in the desirable 3–30 m particle size range and the most desirable 10–30 m particle size range.

Although the present invention has been described in considerable detail with reference to certain preferred versions thereof, other versions are possible. Therefore, the spirit and scope of the appended claims should not be limited to the description of the preferred versions contained herein.

What is claimed is:

1. A method of producing powdered materials of narrow particle size range comprising the following steps:

a) providing a mixture of non-electrically conducting solid particles;

b) creating an electrostatic charge on particles of said mixture;

c) grinding said mixture and exposing said mixture during grinding to an electric potential sufficient to produce a corona discharge;

d) separating particles from the ground mixture according to particle size range;

e) collecting the separated particles.

2. The method of claim 1 in which the electrical potential has a range of 10 V to 60 V.

3. The method of claim 2 in which the mixture comprises initial clinker and gypsum.

4. The method of claim 2 in which the electrical potential has a range of 35 V to 45 V.

5. A cement powder having a narrow particle size range made by the method of:

a) providing a mixture of cement particles;
b) creating an electrostatic charge on particles of said mixture;
c) grinding said mixture and exposing said mixture during grinding to an electric potential sufficient to produce a corona discharge;
d) separating particles from the ground mixture according to particle size range;
e) collecting the separated particles.

6. The cement powder of claim 5 exposed in step c) to an electric potential of 10 V to 60 V.

7. The cement powder of claim 6 comprising 71% to 78% by mass of particles having a size in the range of 3 μm–30 μm.

8. The cement powder of claim 7 made from a mixture of cement particles comprising 95% by mass of initial clinker and 5% by mass of gypsum.

* * * * *